United States Patent [19]

Bafaro et al.

[11] 4,214,188
[45] Jul. 22, 1980

[54] DYNAMIC FOCUS FOR A CATHODE RAY TUBE

[75] Inventors: Michael P. Bafaro, Park Ridge; James J. Parker, Elmhurst, both of Ill.

[73] Assignee: Motorola, Inc., Schaumburg, Ill.

[21] Appl. No.: 908,297

[22] Filed: May 22, 1978

[51] Int. Cl.² ............................................. H01J 29/58
[52] U.S. Cl. ................................ 315/382; 315/31 TV
[58] Field of Search ................ 315/31 TV, 382, 13 C, 315/368

[56] References Cited

U.S. PATENT DOCUMENTS

| | | | |
|---|---|---|---|
| 2,880,358 | 3/1959 | Parker | 315/31 TV |
| 3,146,373 | 8/1964 | Janssen | 315/382 |
| 3,412,281 | 11/1968 | Richards, Jr. et al. | 315/31 TV |
| 4,140,948 | 2/1979 | Ikebata | 315/368 |

*Primary Examiner*—Theodore M. Blum
*Attorney, Agent, or Firm*—Margaret M. Parker; James W. Gillman

[57] ABSTRACT

Dynamic focus voltages for a CRT are obtained by utilizing the combined parabolic conversion wave shapes for control of the focusing electrode to provide sharp focus at all points in the raster. A current source is coupled to the focus divider chain and the conversion wave shape controls the current in the divider chain by controlling the resistance in a transistor. No high voltage capacitors are required since the dynamic voltages are coupled into the chain near the low voltage end.

7 Claims, 4 Drawing Figures

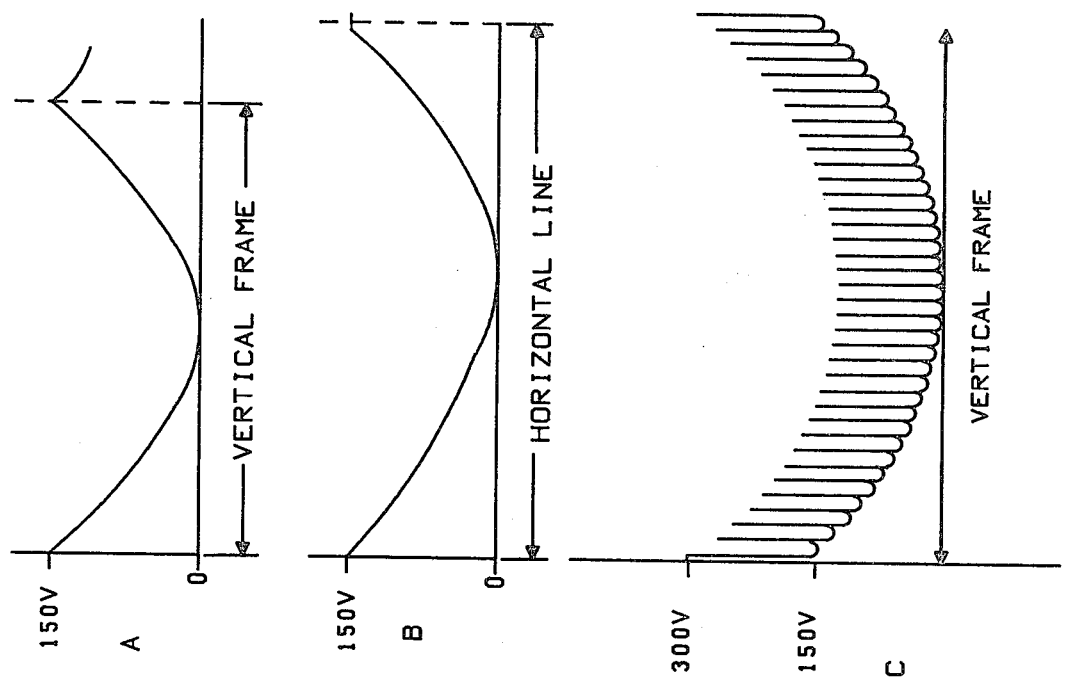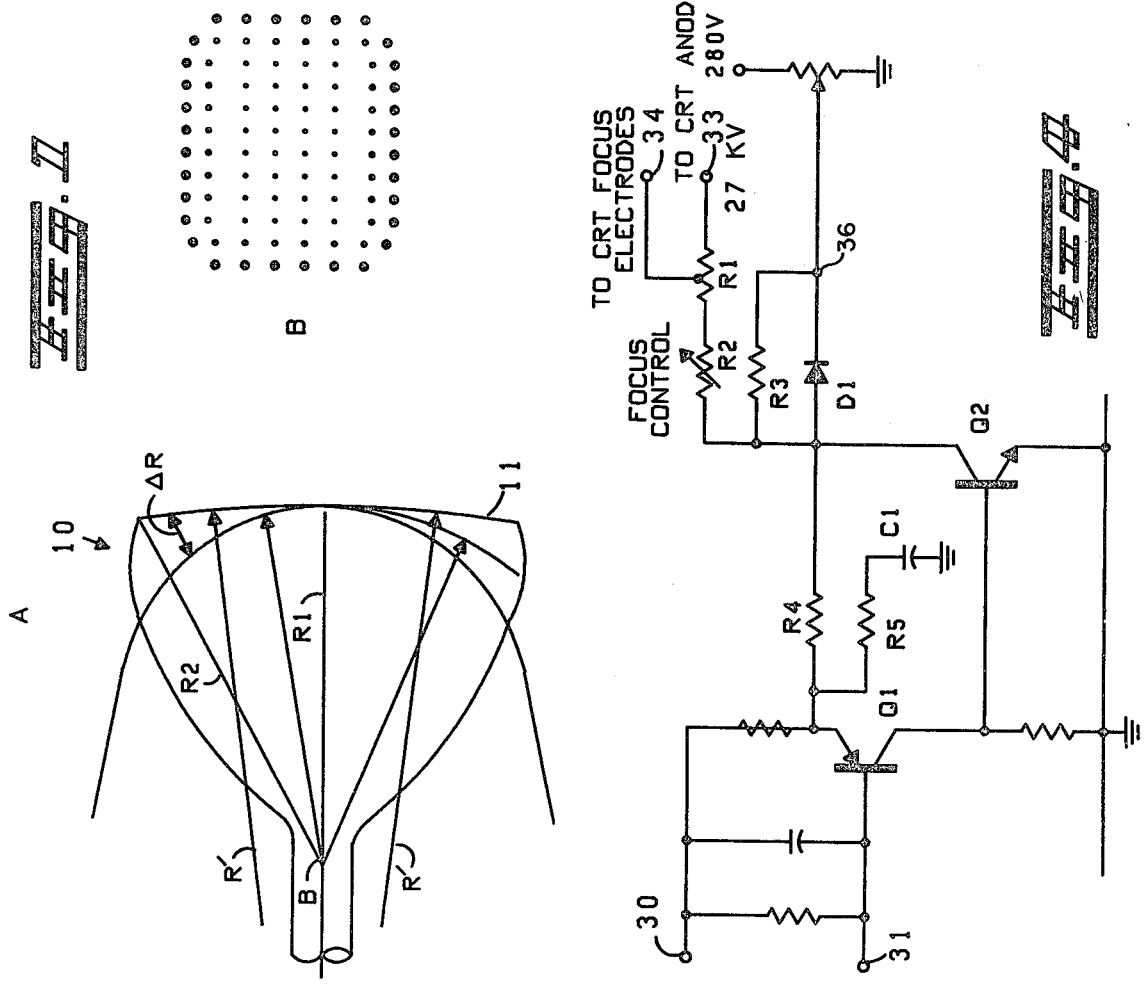

DYNAMIC FOCUS FOR A CATHODE RAY TUBE

BACKGROUND OF THE INVENTION

This invention relates to the field of cathode ray tubes and, more particularly, to the provision for dynamic focusing voltages for use in such tubes.

In CRT devices, the major factor effecting spot focus is the variation in the distance from the electron gun to the fluorescent screen as the electron beam is swept from the center of the screen to the outer areas. For accurate focusing of the beam at all parts of the screen, the voltage applied to the focus electrode must be varied as a function of the distance from the spot to the Z axis of the CRT device, or, in other words, a function of the angle of deflection. This requires a voltage which varies as the beam moves horizontally and also as it moves vertically. As a reasonable approximation, this requires a horizontal voltage variation at line rate which is of essentially parabolic shape, and which is superimposed on a similar function at the vertical frame rate. Earlier CRT designs provided minimum spot de-focusing by optimizing focus at some point intermediate the center of the CRT screen and the edges of the raster; e.g., 30° from the Z axis was typical. Later it was recognized that a better solution would be to add to the static focusing voltage a voltage varying with the angle of deflection. All known circuits for accomplishing dynamic focusing in this way have required high voltage coupling capacitors and thus were expensive and not adaptable to solid state implementation.

SUMMARY OF THE INVENTION

It is therefore an object of the present invention to provide dynamic focusing for a CRT utilizing waveforms which are already present in the CRT device.

It is a more particular object to devise such dynamic focusing with solid state circuitry and without large and costly high voltage capacitors.

These objects and others are provided by circuitry constructed in accordance with the invention in which the effective resistance of a transistor circuit is varied as a function of the convergence waveform. The transistor circuit is coupled in series with the focus divider chain, thus the current in the chain is varied accordingly. No high voltage capacitors are required for coupling the dynamic focus voltage to the CRT device since the transistor is near the low voltage end of the divider chain. The convergence waveform is a combination of two waveforms, one at line rate and one at frame rate, each essentially of parabolic form.

BRIEF DESCRIPTION OF THE DRAWING

FIG. 1a is a diagram of a CRT device showing the dimensional basis for the problem which is solved by the invention.

FIG. 1b is a diagram of a dot pattern of a CRT device lacking the circuit of the invention.

FIGS. 2a–2c are illustrations of the voltage waveforms required for the invention.

FIG. 4 is an embodiment of the circuitry of the invention.

DETAILED DESCRIPTION OF THE PREFERRED EMBODIMENT

Figure 3:
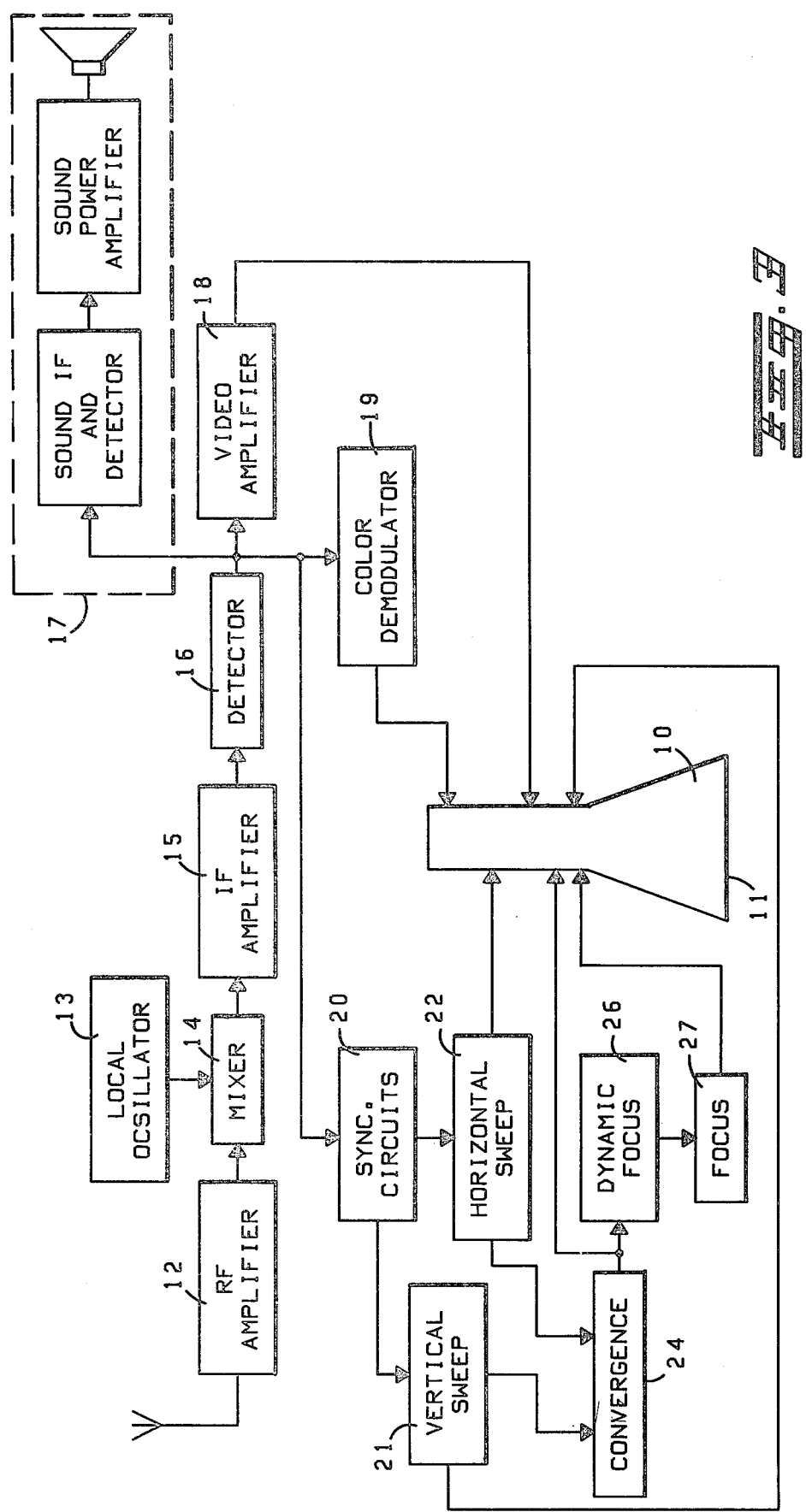
FIG. 3 is a block diagram of a device utilizing a CRT and including the invention.

The diagram of FIG. 1a is intended to make clear the problem to be solved by the circuit of the invention. A 3-gun cathode ray tube (CRT) 10 of the type used in color television is shown in outline form. Such tubes typically have a rounded face plate or screen 11 (bearing the phosphors) with a radius of curvature R' longer than the entire tube length, however, the invention is applicable even to flat face plate tubes. The electron beam thus travels a path R2 from the point of deflection B to the edges of the screen 11 which is longer than the path R1 to the central portion, ΔR being the instantaneous difference. It will be seen then that the focusing voltage must be adjusted to compensate for this difference as the electron beam is swept from side to side and top to bottom of a raster.

FIG. 1b is a graphical representation of the spot defocusing which occurs at the outer portions of a CRT screen if dynamic focusing is not used. Instead of providing a sharp focus spot, as at the center of the screen, a small circle is produced which reduces the definition of the displayed information.

FIG. 2 shows the types of waveforms needed to provided dynamic focusing and eliminate the de-focusing effect of FIG. 1b. As may be seen in FIG. 2a, a roughly parabolic waveform repeating at frame rate, is needed for the vertical dimension. A similar waveform, FIG. 2b, but repeating at line rate, is needed for the horizontal dimension. FIG. 2c illustrates the combined waveform with the horizontal rate greatly reduced for clarity. As may be seen, no dynamic focusing voltage is applied as the electron beam sweeps the central portion of the screen.

FIG. 3 is a block diagram of a typical video receiver utilizing a raster to display information and is given here only for a better understanding of the invention as the invention could, for example, be utilized in a monitor which lacks much of this circuitry. The RF amplifier 12, local oscillator 13, mixer 14, IF amplifier 15, detector 16, sound portion 17, video amplifier 18 and color demodulator 19 all function as is well known in the art. The detector 16 output is also coupled to sync circuits 20, which provide synchronization for vertical and horizontal sweep circuits 21 and 22 respectively. The sync signals are coupled to the CRT 10 for providing a raster on the screen 11 of the tube. The sweep circuits 21 and 22 are also coupled to a convergence circuit 24 which is coupled to the CRT 10.

The vertical and horizontal sweep circuits 21 and 22 are coupled to the convergence circuit 24 which is connected to the convergence coil of the CRT 10. In this embodiment of the invention the convergence circuit 24 is also coupled through a dynamic focus circuit 26 to the focus circuit 27 which is coupled to the CRT 10.

FIG. 4 is a schematic diagram of one embodiment of the dynamic focus circuit of the invention. The terminal 30 is coupled to an amplifier including a transistor Q1. The terminal 30 could be coupled through the convergence circuit 24 as shown in FIG. 3 or from the pin cushion circuitry (not shown) which also has the vertical rate parabolic waveform. A terminal 31 may couple an input signal, as from the convergence circuit, which has the desired parabolic waveform at the horizontal or line rate. A terminal 33 is coupled to a high voltage source; i.e., the CRT anode voltage supply. Forming a voltage divider across the high voltage is a tapped resistor R1, a potentiometer or variable resistor R2 (the "focus" control) and a transistor Q2. The tap on resistor R1 is coupled to the focus electrode of the CRT by way of a terminal 34. It will be seen that the voltage on the terminal 34 can be varied or modulated by varying the effective resistance of the transistor Q2. A low voltage is coupled from a terminal 36 to the collector of the transistor Q2 by way of a biasing transistor R3 and a clamping diode D1. The voltage on terminal 36 is preferably a variable voltage to provide for the slight variations which occur from one CRT to another. A resistor R4 provides a feedback path, and a resistor R5 and a capacitor C1 provide the necessary time constant. Once the focus control R2 is set to provide minimum beam spot size at the center of the screen, the added voltage, having parabolic waveforms at both horizontal and vertical rate, will optimize the focusing at the edges of the raster.

Thus, there has been shown and described a means of providing dynamic focusing for a CRT by using a voltage such as the pin cushion correction voltage or the dynamic convergence voltage to control the effective resistance of a solid state circuit which in turn controls the current in the focus circuit of a CRT.

It will be apparent that there are a number of variations and modifications of the above-described embodiment and it is intended to include all such as fall within the spirit and scope of the appended claims.

What is claimed is:

1. In a cathode ray tube device for displaying information by means of a raster:

a cathode ray tube having an anode and a focus electrode;

an input source of AC voltage having variations of substantially parabolic waveform at both horizontal and vertical rates;

a source of high voltage DC coupled to the anode;

transistor means for amplifying said input AC voltage and coupled to ground and to the ac input source; and resistive means including first and second elements, the first element coupled between the source of high voltage and the focus electrode, the second element coupled between the focus electrode and the transistor means, the first element having a resistance substantially greater than that of the second element.

2. A cathode ray tube device for displaying information on a raster in accordance with claim 1 and wherein the resistive means also includes a manually variable resistive means.

3. A cathode ray tube device for displaying information on a raster in accordance with claim 2 wherein the manually controllable resistive means is a focus control.

4. A cathode ray tube device for displaying information on a raster in accordance with claim 1 and further including an amplifier stage coupled between the source of AC voltage and the transistor means.

5. A cathode ray tube device for displaying information on a raster in accordance with claim 1 and wherein said lower DC voltage is manually variable.

6. A cathode ray tube device for displaying information on a raster in accordance with claim 1 and further including a source of relatively low voltage DC coupled to the junction of the second resistive means element and the transistor means.

7. A cathode ray tube device for displaying information on a raster in accordance with claim 6 wherein the source of relatively low voltage DC is coupled to the junction through a clamping diode means and a biasing resistive means.

* * * * *